United States Patent
Xu et al.

(10) Patent No.: US 8,085,004 B2
(45) Date of Patent: *Dec. 27, 2011

(54) GENERATOR WITH QUADRATURE AC EXCITATION

(75) Inventors: Mingzhou Xu, Oro Valley, AZ (US); Cristian E. Anghel, Oro Valley, AZ (US); Wayne T. Pearson, Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/954,231

(22) Filed: Nov. 24, 2010

(65) Prior Publication Data

US 2011/0068753 A1 Mar. 24, 2011

Related U.S. Application Data

(62) Division of application No. 11/758,163, filed on Jun. 5, 2007, now Pat. No. 7,863,868.

(51) Int. Cl.
*H02P 9/00* (2006.01)
(52) U.S. Cl. ............ 322/59; 290/31
(58) Field of Classification Search ........... 322/89, 322/44, 17; 290/31, 34, 40 R
See application file for complete search history.

(56) References Cited

U.S. PATENT DOCUMENTS

| | | | |
|---|---|---|---|
| 3,378,756 A | 4/1968 | Potter | |
| 3,483,463 A * | 12/1969 | Smith | 322/29 |
| 4,246,531 A | 1/1981 | Jordan | |
| 4,719,378 A | 1/1988 | Katsuma et al. | |
| 4,841,185 A * | 6/1989 | Weldon | 310/115 |
| 6,188,204 B1 | 2/2001 | Vithayathil et al. | |
| 6,252,331 B1 * | 6/2001 | Mildice et al. | 310/263 |
| 6,788,031 B2 | 9/2004 | Pendell | |
| 7,064,455 B2 | 6/2006 | Lando | |
| 7,081,698 B1 * | 7/2006 | Burkholder et al. | 310/261.1 |
| 7,088,027 B2 | 8/2006 | Leijon et al. | |
| 7,301,311 B2 | 11/2007 | Xu et al. | |
| 7,514,806 B2 * | 4/2009 | Xu et al. | 290/31 |

(Continued)

OTHER PUBLICATIONS

Dishner, Bryan; Morris, Angela, "Novel Electromechanical Approach to Constant Frequency Power Generation", IEEE Proceedings of the National Aerospace and Electronics Conference, v 4, 1989, p. 1765-1769, NAECON 1989, May 22-26, 1989, Dayton, OH.

*Primary Examiner* — Julio Gonzalez
(74) *Attorney, Agent, or Firm* — Miriam Jackson, Esq.

(57) ABSTRACT

A generator system is configured to supply two phase excitation current from an exciter rotor to a main generator rotor. When driven by a variable speed prime mover, the generator system provides relatively constant frequency AC power by independently controlling the main rotor flux rotational speed. The generator system includes an exciter stator that induces current in the exciter rotor windings at a desired frequency and phasing. The exciter rotor windings are electrically connected to the main rotor windings to provide two-phase excitation current to the main rotor windings. Excitation is supplied to the exciter stator from an exciter controller, which controls the frequency and phasing of the exciter excitation, based on the rotational speed of the generator, to maintain a constant output frequency. The exciter frequency control function of the exciter controller may be eliminated when the generator system is driven by a constant speed prime mover or when a narrow band variable frequency output is required.

14 Claims, 5 Drawing Sheets

U.S. PATENT DOCUMENTS

| | | |
|---|---|---|
| 2004/0027077 A1 | 2/2004 | Xu et al. |
| 2004/0027078 A1 | 2/2004 | Xu et al. |
| 2004/0066098 A1 | 4/2004 | Doherty et al. |
| 2004/0080300 A1 | 4/2004 | Xu et al. |
| 2005/0023924 A1 | 2/2005 | Tornquist et al. |
| 2005/0180862 A1 | 8/2005 | Lando |
| 2005/0206352 A1 | 9/2005 | Xu et al. |
| 2005/0225303 A1 | 10/2005 | Xu et al. |
| 2006/0087123 A1* | 4/2006 | Stout et al. .................. 290/2 |
| 2006/0087293 A1* | 4/2006 | Xu et al. ..................... 322/59 |
| 2006/0181171 A1* | 8/2006 | Zhao .................... 310/154.22 |
| 2006/0192535 A1 | 8/2006 | Lando |
| 2008/0067984 A1* | 3/2008 | Anghel et al. ............... 322/52 |

* cited by examiner

GENERATOR WITH QUADRATURE AC EXCITATION

CROSS-REFERENCE TO RELATED APPLICATIONS

This application is a divisional of U.S. patent application Ser. No. 11/758,163 filed Jun. 5, 2007.

BACKGROUND OF THE INVENTION

The present invention relates to AC generators and, more particularly, to AC generators that are driven by mechanical rotational force exerted on a shaft of the AC generator, in order to provide either a constant frequency output from a variable speed input, an output having a frequency within a narrow range from a variable speed input, or a constant frequency output that is shifted in space and time from a constant speed input.

Many aircraft include AC generator systems to supply relatively constant frequency AC power. Many of the AC generator systems installed in aircraft include three separate brushless generators, namely, a permanent magnet generator (PMG), an exciter, and a main generator. The PMG includes a rotor having permanent magnets mounted thereon, and a stator having a plurality of windings. When the PMG rotor rotates, the permanent magnets induce AC currents in PMG stator windings. These AC currents are typically fed to a regulator or a control device, which in turn outputs a DC current to the exciter.

The exciter typically includes single-phase (e.g., DC) stator windings and multi-phase (e.g., three-phase) rotor windings. The DC current from the regulator or control device is supplied to exciter stator windings, and as the exciter rotor rotates, three phases of AC current are typically induced in the rotor windings. Rectifier circuits that rotate with the exciter rotor rectify this three-phase AC current, and the resulting DC currents are provided to the main generator. The main generator additionally includes a rotor and a stator having single-phase (e.g., DC) and multi-phase (e.g., three-phase) windings, respectively. The DC currents from the rectifier circuits are supplied to the rotor windings. Thus, as the main generator rotor rotates, three phases of AC current are induced in main generator stator windings. This three-phase AC current can then be provided to a load such as, for example, electrical aircraft systems.

Many of these AC generator systems are driven by variable speed prime movers. For example, many generators are driven by the aircraft engines, which may vary in rotational speed during operation. Thus, to ensure the AC generators supply relatively constant frequency AC power, many aircraft include a hydro-mechanical transmission, or other type of gear arrangement, that converts the variable engine speed to a relatively constant rotational speed.

Although the above-described configuration is generally safe, it does suffer certain drawbacks. For example, hydro-mechanical transmissions can be relatively large, heavy, and complex, and they may also exhibit relatively poor reliability. Each of these factors can lead to increased overall aircraft, fuel, and maintenance costs, and/or increased maintenance frequency, which can further lead to increased costs.

One solution to the above-noted drawbacks is disclosed in U.S. Pat. No. 6,188,204 to Vithayathil et al. The solution disclosed therein employs main windings and auxiliary windings disposed on the same rotor. The auxiliary windings are supplied with adjustable frequency AC power, and in turn excite the main windings to produce a desired three phase output frequency. Although this solution does work, it also suffers certain drawbacks, namely, the main and auxiliary windings must be arranged to be magnetically decoupled by configuring a specified numbers of poles, so that the flux generated by the main windings does not induce any voltage in the auxiliary windings that has a different number of poles or vice versa. This can lead to complexity in design and implementation.

Another solution is disclosed in U.S. Pat. No. 7,064,455 to Lando. This solution employs rotor windings of the exciter and the main generator disposed on the same primary shaft, with permanent magnet generator (PMG) disposed about an associated secondary shaft, for determining the rotational speed of the primary shaft. The rotors of the exciter and main generator employ three-phase windings. However, this design offers no improvement over the complexity inherent in such three-phase windings.

Hence, it can be seen that there is a need for a system and method of supplying relatively constant frequency AC power from a generator that is driven by a variable speed prime mover that is a relatively small, lightweight, less complex, and more reliable, as compared to current systems and methods, and that does not rely on specified numbers of exciter and main generator poles.

SUMMARY OF THE INVENTION

In one aspect of the present invention, a generator system comprises a main generator with a main generator rotor that has a plurality of main generator rotor windings wound thereon and a main generator stator that has a plurality of main generator rotor windings wound thereon; and an exciter having an exciter rotor and an exciter stator, the exciter rotor having exciter rotor windings wound thereon and the exciter stator having exciter stator windings wound thereon. The exciter rotor is configured to provide two phase excitation current to the main generator rotor windings. The windings on either the exciter rotor, the main generator rotor, or both, may be shifted by a value chosen from a range of from 80 electrical degrees to 100 electrical degrees, with a choice of 90 electrical degrees being preferable. The connections between main rotor and exciter rotor windings can be made in the same phase sequence or opposite phase sequence, with the opposite phase sequence being preferable.

In another aspect of the invention, and by way of example only, a generator system is provided, which comprises a shaft rotating at a rotational speed provided by a prime mover; a main generator stator with a plurality of main stator windings wound thereon; a main generator rotor mounted on the shaft and disposed at least partially within the main generator stator, the main generator rotor having a plurality of main generator rotor windings wound thereon to receive a two-phase alternating current, so that the main generator rotor windings generate an air gap flux when they are electrically excited; an exciter rotor mounted on the shaft, the exciter rotor having a plurality of exciter rotor windings wound upon it, the exciter rotor windings electrically connected to the main generator rotor windings and configured, upon electrical excitation thereof, to supply the two-phase electrical excitation to the main generator rotor windings; an exciter stator surrounding at least a portion of the exciter rotor, the exciter stator having a plurality of exciter stator windings wound thereon, the exciter stator windings configured, upon electrical excitation thereof, to electrically excite the exciter rotor windings; and an exciter controller electrically coupled to the exciter stator windings, the exciter controller configured to provide electrical excitation to the exciter stator windings This results in controlled constant output frequency and voltage amplitude (constant output within a certain uncertainty).

In still another aspect of the invention, and by way of example only, an aircraft generator system is provided, in which the system is driven by an aircraft gas turbine engine as the prime mover, The system comprises a housing; a shaft rotationally mounted within the housing; a main generator stator mounted within the housing and having a plurality of main stator windings wound thereon; a main generator rotor mounted on the shaft and disposed at least partially within the main stator, the main generator rotor having a plurality of main generator rotor windings wound thereon configured to receive a 2-phase excitation current, wherein the main generator rotor windings generate an air gap flux upon electrical excitation thereof; an exciter rotor mounted on the shaft, the exciter rotor having a plurality of exciter rotor windings wound thereon, the exciter rotor windings electrically connected to the main generator rotor windings and configured, upon electrical excitation thereof, to supply the two-phase electrical excitation to the main generator rotor windings; an exciter stator surrounding at least a portion of the exciter rotor, the exciter stator having a plurality of exciter stator windings wound thereon, the exciter stator windings configured, upon electrical excitation thereof, to electrically excite the exciter rotor windings; a speed signal source configured to supply a speed signal representative of the rotational speed of the shaft; and an exciter controller electrically coupled to at least the exciter stator windings and coupled to receive the speed signal, the exciter controller configured, in response to the speed signal, to determine the correct supply amplitude, frequency and phase sequence to responsively supply electrical excitation to the exciter stator windings that results in the main generator rotor windings generating the air gap flux at a substantially constant, predetermined frequency.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various configurations of the AC generator provided by the invention may use independently controlled field rotational speeds to supply (1) relatively constant frequency AC voltages under varying mechanical rotational speeds, (2) relatively constant frequency AC voltages under relatively constant mechanical rotational speeds that may be different than the synchronous speed, and (3) variable frequency, or VF, AC voltages under variable mechanical rotational speeds, where the VF range is smaller than the synchronous speed range. More specifically, the generator described herein may employ the use of two-phase current to transfer energy from the exciter rotor to the main generator rotor, whereas in the prior art, three-phase current is used. By using two-phase instead of three-phase power transfer between the rotors, a simple winding scheme for the rotor poles can be used, which greatly reduces the complexity of the general construction of the generator.

Figure 1:
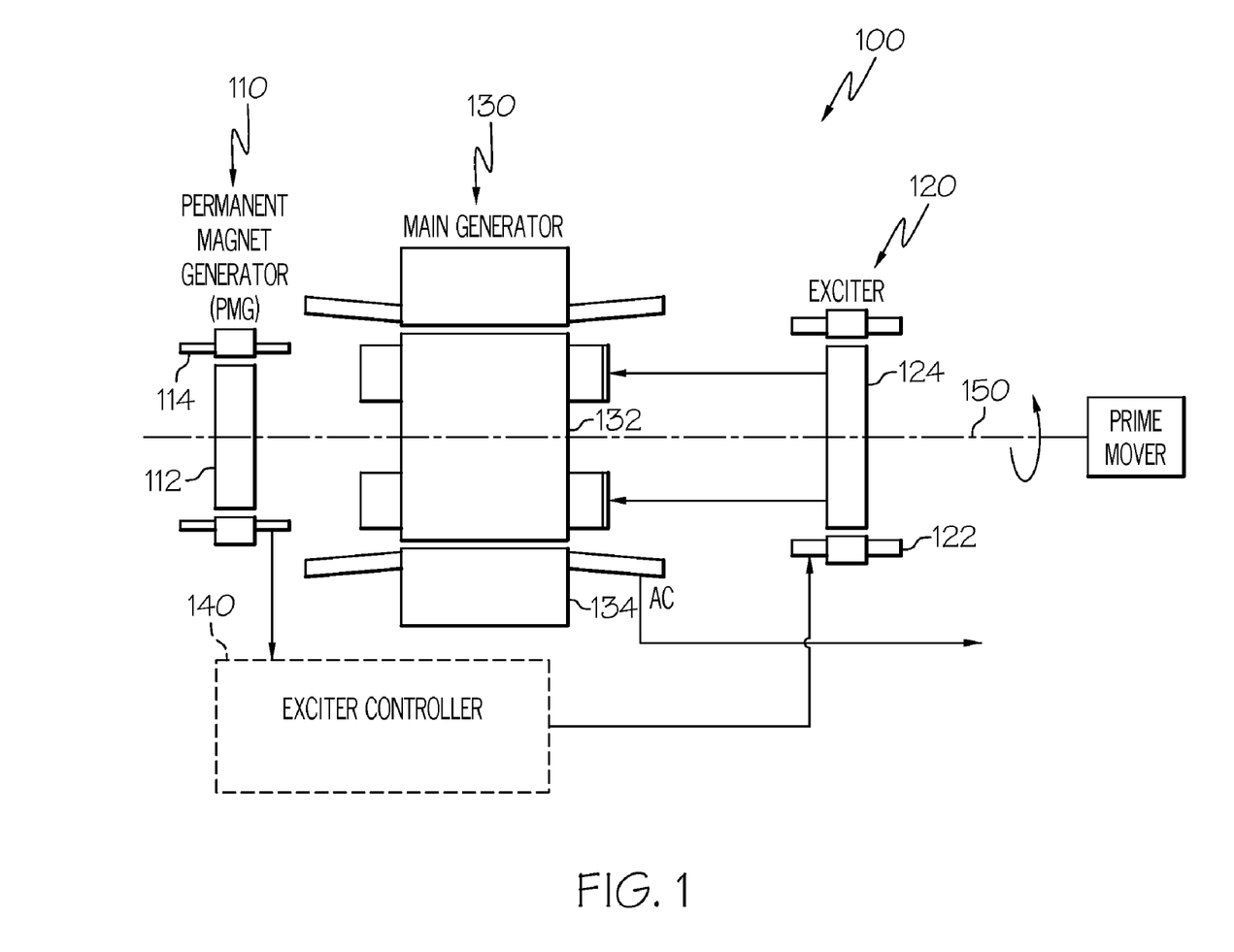
FIG. 1 is a functional block diagram of an exemplary high speed generator system according to an embodiment of the present invention.

Turning now to the description and with reference first to FIG. 1, a functional schematic block diagram of an exemplary high speed generator system 100 for use with, for example, an aircraft gas turbine engine, is shown. This exemplary generator system 100 may include a permanent magnet generator (PMG) 110, an exciter 120, a main generator 130, and an exciter controller 140. It will be appreciated that the generator system 100 may also include one or more additional components, sensors, or controllers. However, a description of these additional components, sensors, and controllers, if included, is not necessary for a description of the invention, and will therefore not be further depicted or described.

In the depicted embodiment, a PMG rotor 112 of the PMG 110, an exciter rotor 124 of the exciter 120, and a main generator rotor 132 of the main generator 130 may be mounted on a common drive shaft 150. The drive shaft 150 may receive a rotational drive force from a prime mover 160, such as an aircraft gas turbine engine, which may cause the PMG rotor 112, the exciter rotor 124, and the main generator rotor 132 to all rotate at the same rotational speed. As noted before, the rotational speed of the prime mover 160, and thus these generator system components, may vary. For example, in one embodiment described in more detail below, the rotational speed may vary within a range of about 1,200 rpm to about 4,800 rpm. It will be appreciated that this rotational speed range may be merely exemplary, and that various other speed ranges may be used without departing from the scope of the invention.

Regardless of the specific rotational speed range, it will be appreciated that as the PMG rotor 112 rotates, the PMG 110 may generate and supply AC power to the exciter controller 140 from a PMG stator 114. In response, the exciter controller 140 may be electrically coupled to an exciter stator 122 of the exciter 120 to supply AC power to the exciter stator 122. In turn, this may induce the exciter rotor 124 to supply an induced alternating current to the main generator rotor 132. As the main generator rotor 132 rotates, it may induce AC current in a main generator stator 134, which may be, in turn, supplied to one or more loads.

Figure 2:
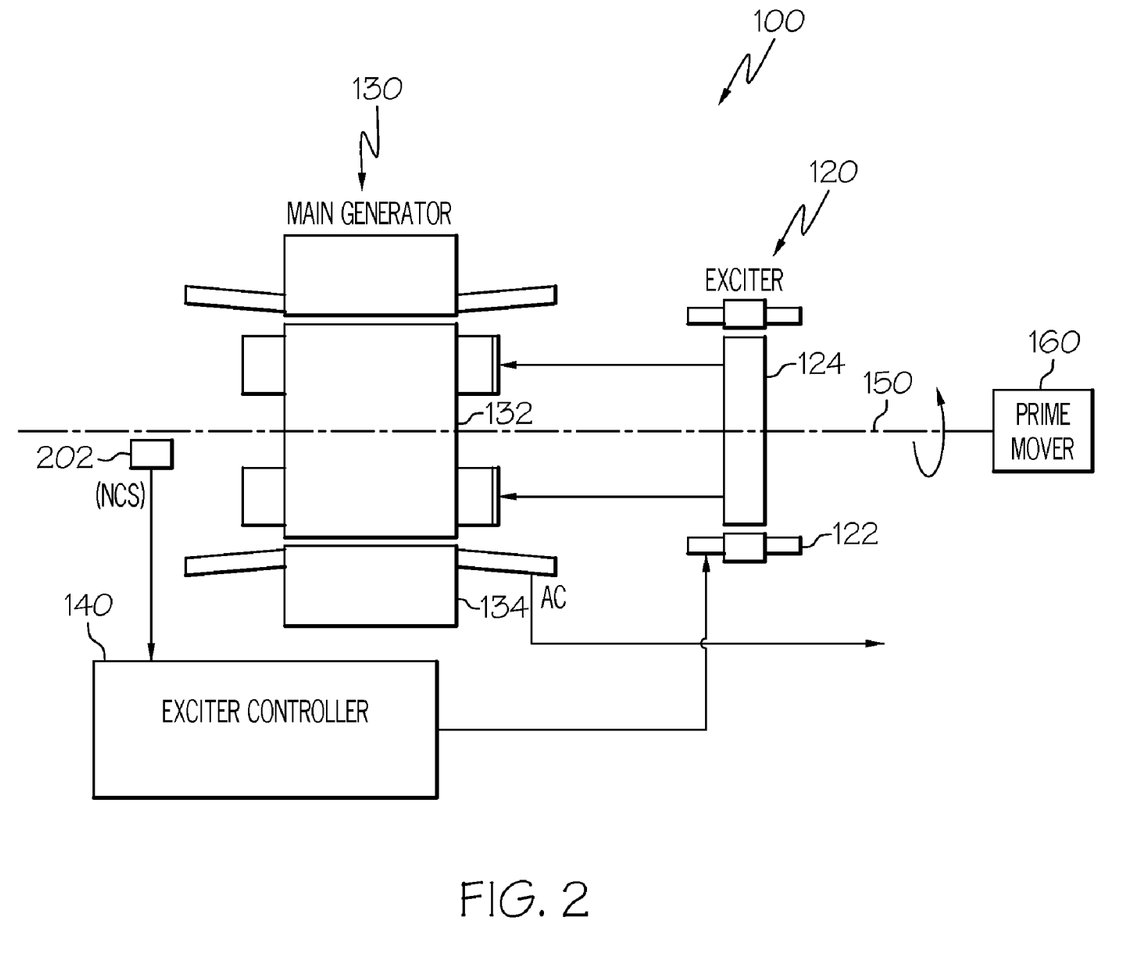
FIG. 2 is a functional block diagram of an exemplary high speed generator system according to an alternative embodiment of the present invention.

Before proceeding further, it will be appreciated that although the generator system 100 described above is implemented with a PMG 110, the generator system 100 could alternatively be implemented with other devices in place of the PMG 110, which respond to the rotational speed of the drive shaft 150. In such an alternative embodiment, as shown in FIG. 2, the generator system 100 may include a speed sensor 202 rather than the PMG 110. The speed sensor 202, which may be implemented using any one of numerous types of rotational speed sensors, may be configured to sense the rotational speed of the drive shaft 150 and supply a speed signal (Ns) representative of the rotational speed of the drive shaft 150 to the exciter controller 140. The exciter controller 140 may use this speed signal Ns to modulate an energy source (not shown) that is independent of the AC generator system 100, e.g. another generator associated with the prime mover but decoupled from the shaft or a battery-operated generator. Although the exciter controller 140 in this alternative embodiment may also supply AC power to the exciter stator 122, it may do so in response to the speed signal from the speed sensor 202 rather than in response to the AC power supplied from the PMG 110, the frequency of which may be indicative of the rotational speed of drive shaft 150. In yet another embodiment (not shown), the exciter controller 140 may use a frequency signal from main generator stator windings 404 to determine the correct input frequency to the exciter stator windings 406 to achieve the predetermined constant output frequency at the main generator 130. In all embodiments, however, it should be noted that the signal supplied to the exciter controller 140, regardless of whether it is the AC power signal from the PMG 110 or the speed signal from the speed sensor 202, may be representative of shaft rotational speed.

Figure 3:
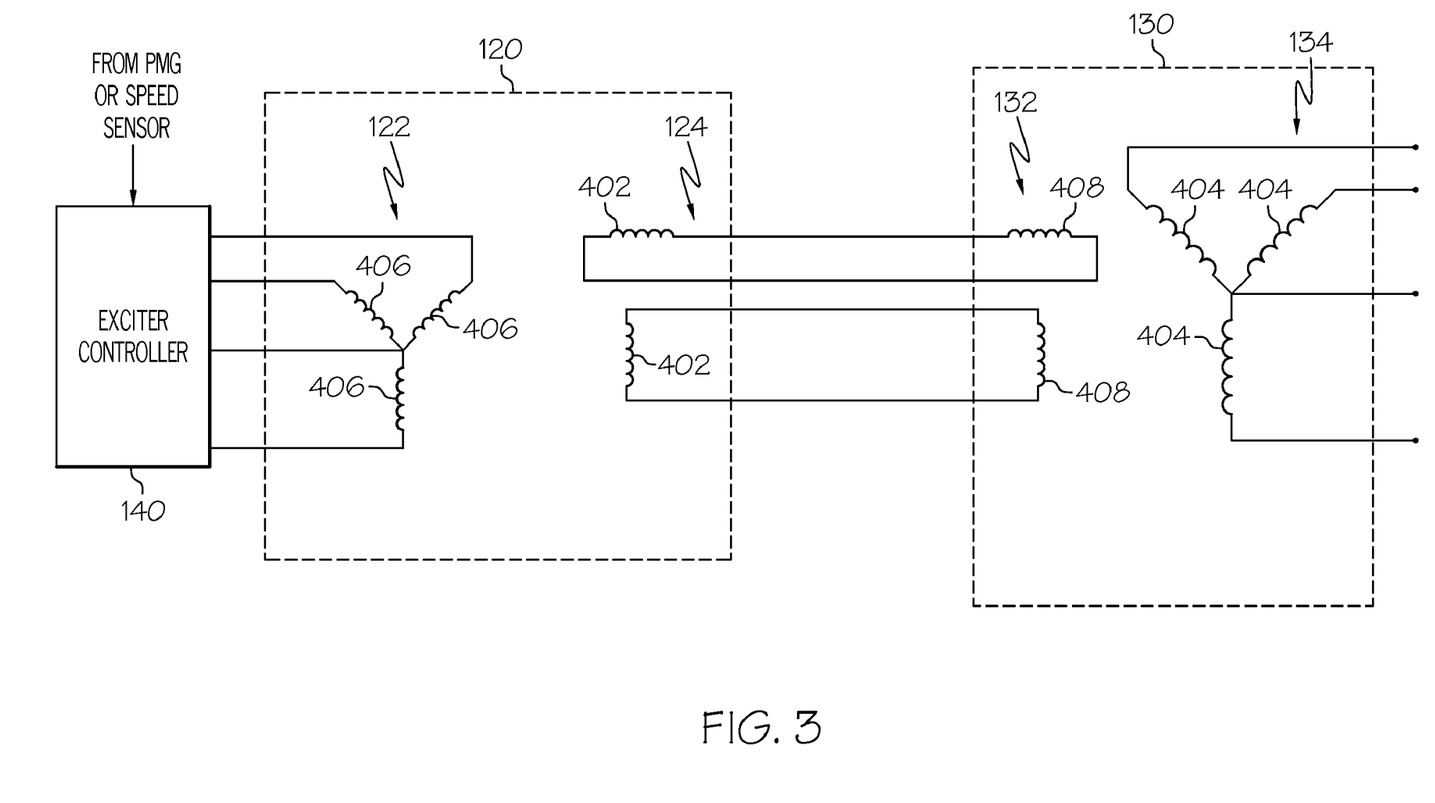
FIG. 3 is a schematic representation of an embodiment of the high speed generators of FIGS. 1 and 2.
Figure 4:
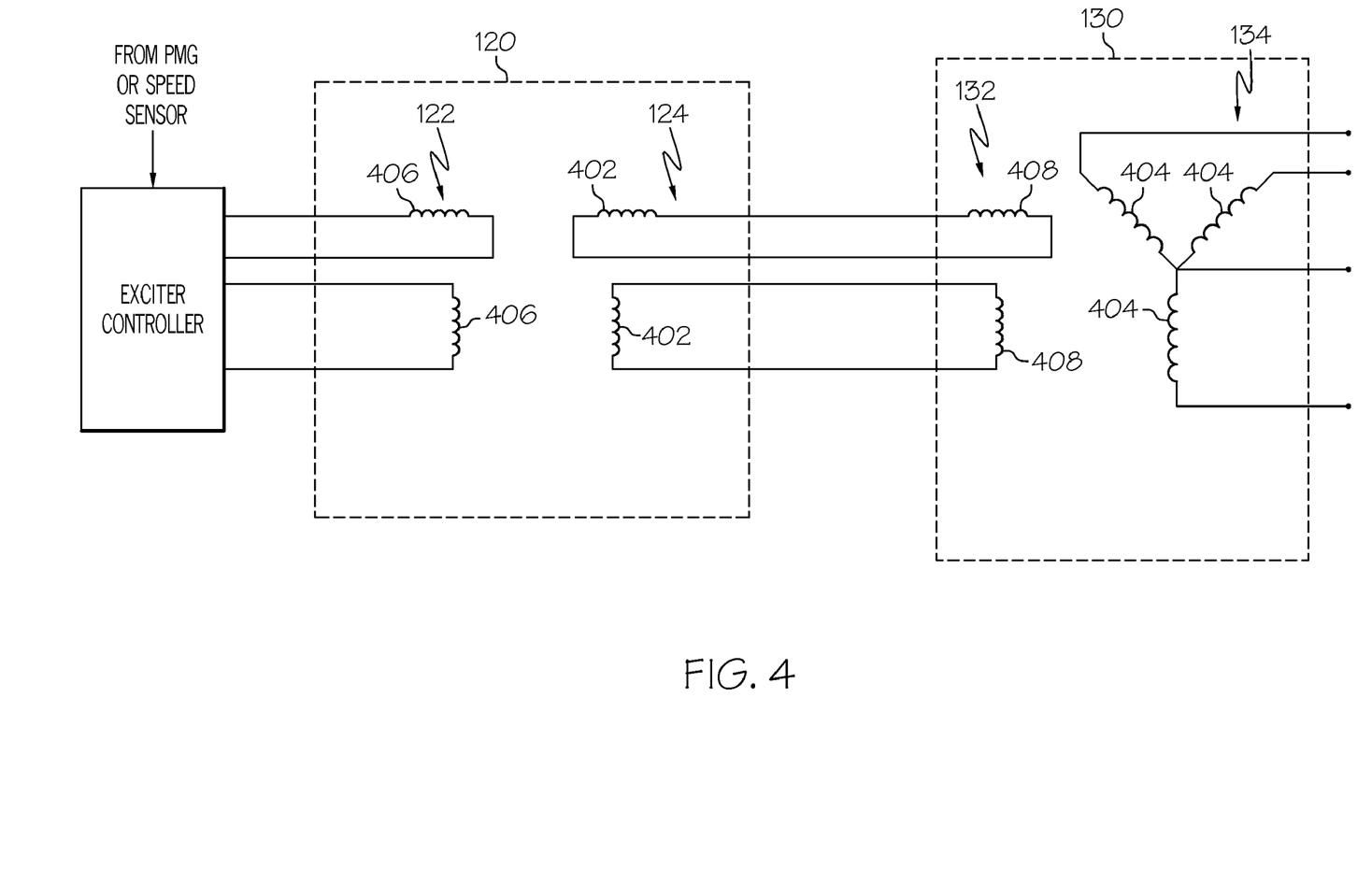
FIG. 4 is a schematic representation of another embodiment the high speed generators of FIGS. 1 and 2.

Referring now to FIG. 3, it may be seen, for example, that the exciter rotor 124 and the main generator rotor 132 may be configured differently from conventional brushless AC generator systems, and the exciter stator 122 and main generator stator 134 may also be configured differently from conventional brushless AC generator systems. In particular, the exciter rotor 124 and the main generator rotor 132 may be implemented with two phase exciter rotor windings 402 and two phase main rotor windings 408 respectively. These two phase windings may be configured to be shifted by a value in a range of from 80 electrical degrees to 100 electrical degrees in time and in space, with 90 electrical degrees being the preferable amount. Conversely, the exciter stator 122 may be implemented with three phase exciter stator windings 406 as shown in FIG. 3 or two phase exciter stator windings 406 as shown in FIG. 4, while the main generator stator 134 may be implemented with standard three phase main stator windings 404. It will be appreciated that core of the exciter stator 122 can be configured to use either slotted cylindrical poles or salient poles. Another difference from conventional brushless AC generator systems may be that there may be no rotating rectifier assemblies coupled between the exciter rotor 124 and the main rotor 132. Rather, the exciter rotor windings 402 may be directly coupled to the main rotor windings 408. Note that the exciter can be operated in at least three different modes, namely, sub-synchronous mode (negative phase sequence), sup-synchronous mode (positive phase sequence), and synchronous mode (DC current), while the main generator may typically be operated in either sub-synchronous mode or sup-synchronous mode. Any combination of these operating modes by the exciter and the main generator may be used without departing from the scope of the invention.

The exciter controller 140 may be implemented, at least in part, as a power converter circuit that is configured, in response to the signal supplied to it from either the PMG 110, the speed sensor 202, or main generator stator windings 404, to supply variable-frequency, three-phase excitation to the exciter stator windings 406, as shown in FIG. 3, with either a relatively positive or negative phase sequence. Alternatively, the exciter controller 140 may be implemented to supply variable frequency, two-phase excitation to the exciter stator windings 406, as shown in FIG. 4. In either case, the exciter rotor windings 402 may be configured to provide two phase excitation current to the main generator rotor windings 408. These two phase windings are shifted by 90 electrical degrees in time and in space. It may be appreciated that relatively negative phase sequence excitation, as used herein, is excitation that is supplied in a direction opposite that which the exciter rotor 124 is rotating, and relatively positive sequence excitation, as used herein, is excitation that is supplied in a direction the same as which the exciter rotor 124 is rotating.

As will be described below, the excitation frequency and phase sequence that the exciter controller 140 may supply to the exciter stator windings 406 may depend upon the rotational speed at which the prime mover 160 is rotating the drive shaft 150 (and thus the PMG rotor 112, the exciter rotor 124, and the main generator rotor 132), upon the number of poles with which the exciter 120 and the main generator 130 are implemented, and upon the desired frequency that the generator system 100 is to supply. The general formula for calculating the characteristic frequency with DC excitation may be given as follows:

$$F=N_sP/120$$

where F is the frequency produced, Ns is the rotational speed of the drive shaft 150, and P is the number of generator poles. In the depicted embodiment of FIG. 3, the prime mover 160 may be configured to rotate the shaft 150 at a rotational speed (Ns) of between about 1,200 rpm and about 4,800 rpm, the exciter 120 may be implemented as a 10-pole exciter and the main generator 130 may be implemented as a 4-pole generator, and the desired constant output frequency from the generator system 100 may be 400 Hz.

A description will now be provided as to how the above-described generator system 100, with the above-noted 4:1 speed variation, the 10-pole exciter 120, and the 4-pole main generator 130, can generate AC power at a constant frequency of 400 Hz. Before doing so, however, it will be appreciated that this speed variation, exciter implementation, main generator implementation, and constant output frequency are merely exemplary. Indeed, the generator system 100 could be driven at over any one of numerous rotational speed ranges, it could be configured with exciters and/or main generators having any one of numerous other numbers of poles, and it could be configured to generate AC power at any one of numerous other constant frequency values. Moreover, the exciter 120 and main generator 130 could be implemented with either an unequal number of poles, as described below, or with an equal number of poles.

Turning now to the description, when the prime mover 160 is rotating the drive shaft 150 at 1,200 rpm, the PMG 110 or the speed sensor 202 may supply a signal representative of this rotational speed to the exciter controller 140. The 10 pole exciter rotor would generate a characteristic frequency F=(1200×10)/120 Hz, or 100 Hz if the excitation current in the exciter stator winding 406 were DC. In reality the exciter controller 140 may supply the exciter stator windings 406 with 260 Hz, negative sequence, three-phase excitation. The 10-pole exciter rotor 124, in response to this excitation, may generate rotor current at a frequency which is the sum of the excitation frequency and the characteristic frequency, or (100+260) Hz, or 360 Hz.

Similarly, a 4-pole, main generator would have a characteristic frequency of 40 Hz ((1200×4)/120)). Since the main generator rotor 132 is excited by a frequency of 360 Hz, then the main generator rotor 132 may generate a main generator air gap flux at a frequency of (40+360) Hz, or 400 Hz. Thus, the generator stator 134 may supply AC current at 400 Hz.

It will be appreciated that the 100 Hz frequency to which the 260 Hz excitation frequency is added is the frequency the exciter rotor 124 would generate at a rotational speed of 1,200 rpm, if the exciter stator windings 406 were supplied with DC excitation. Similarly, if the 4-pole main generator rotor 132 were supplied with DC excitation, as in a conventional brushless AC generator, the generated air gap flux at a rotational speed of 1,200 rpm would be 40 Hz. However, since the main generator rotor 132 is, by virtue of its connection to the exciter rotor 124, being supplied with AC excitation at a frequency of 360 Hz, the resultant main generator air gap flux is instead (40+360) Hz, or 400 Hz.

The general formula for desired frequency Fc from exciter controller can be written as:

$$Fc = NsN/120 \pm NsM/120 - Fo$$

where N is the number of main generator poles; M is the number of exciter generator poles; and Fo is the predetermined output frequency at the main generator stator terminals. The choice of the plus or minus sign depends on the way the two rotor windings are connected to each other, and the sign is positive if they have opposite or additive phase sequence. In the above example, Fo=400 Hz, N=4, M=10, Ns=1200 rpm, so Fc=1200*4/120+1200*10/120−400=−260 Hz, indicating a negative sequence 260 Hz is needed to supply the exciter stator windings 406 in order to generate 400 hz at the main generator when rotating at 1200 rpm.

Likewise, when the prime mover 160 is rotating the drive shaft 150 at 4,800 rpm, the PMG 110 or the speed sensor 202 may supply a signal representative of this rotational speed to the exciter controller 140. In response, the exciter controller 140 may supply the exciter stator windings 406 with 160 Hz, positive sequence, three-phase excitation. The 160 Hz positive sequence frequency can also be determined by using the above general formula Fc=4800*4/120+4800*10/120−400=160 Hz. The 10-pole exciter rotor 124, in response to this excitation, may generate rotor current at a frequency of (400−160) Hz, or 240 Hz, and the main generator rotor 132 may generate a main generator air gap flux at a frequency of (160+240) Hz, or 400 Hz. Thus, the generator stator 134 may continue to supply AC current at 400 Hz.

It will once again be appreciated that the 400 Hz frequency from which the 160 Hz is subtracted is the frequency the exciter rotor 124 would generate at a rotational speed of 4800 rpm, if the exciter stator windings 406 were supplied with DC excitation. And again, if the 4-pole main generator rotor 132 were supplied with DC excitation, the generated air gap flux at a rotational speed of 4,800 rpm would be 160 Hz.

Figure 5:
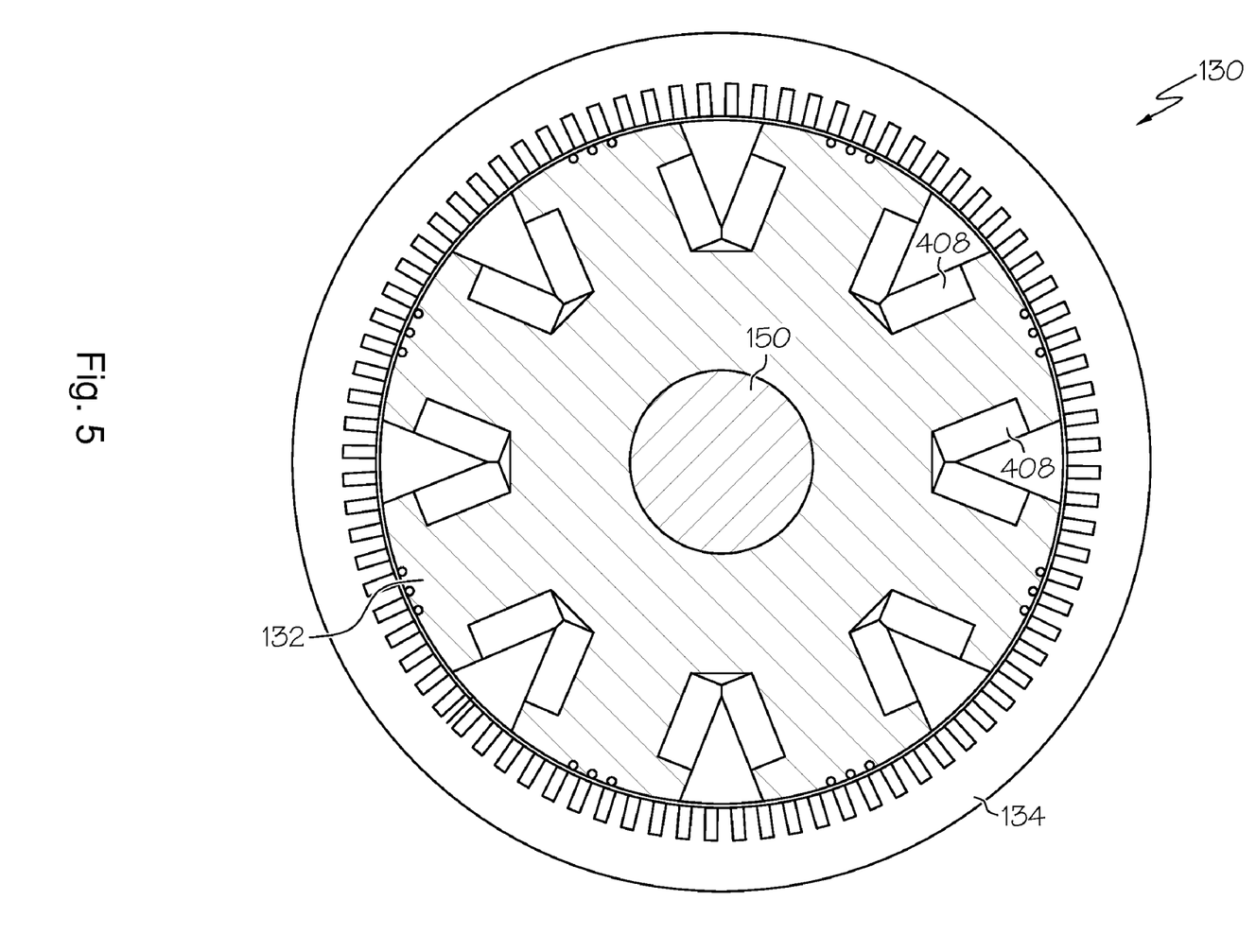
FIG. 5 is a cross-section of a main generator showing an 8 pole configuration.

Referring to FIG. 5, a cross-section of a main generator 130 may be seen, where the particular configuration may include an 8 pole, two-phase main generator rotor 132, where each pole is a salient pole. It will be appreciated that although FIG. 5 shows a rotor core with 8 protruding rotor poles, the main generator rotor is wound and operates as a 4 pole generator. The benefit of using an 8 pole core here is the two phase main rotor windings 408 can be easily wound to meet the requirement of 90 electrical degrees displacement in space. It will be further appreciated that a slotted cylindrical main rotor configuration may also be employed to accommodate the two phase main rotor winding 408 to provide 90 electrical degrees displacement in space and time. The principles described in the invention apply equally to the cylindrical or salient pole main rotor configurations.

Referring again to FIGS. 1 and 2, it should be recognized that the invention may be configured for use when the prime mover 160 rotates the drive shaft 150 at a constant speed. In such a configuration, the frequency control function of the exciter controller 140 may be eliminated. Such a situation may arise in an aircraft with a conventional transmission apparatus that is appropriately geared to reduce and control the rotational speed of the drive shaft 150. For example, if the drive shaft 150 were configured to rotate at a speed of 4000 rpm, then a generator system 100 may be provided that has an exciter 120 with a fixed negative sequence excitation of 133 Hz, a 4 pole main generator 130, and a 4 pole exciter 120, in order to produce an constant output of 400 Hz. Such a configuration may eliminate the requirement for diodes and rectifiers mounted within the exciter and thus would be simpler to manufacture and maintain. It should be noted that in practice the phrase "constant speed" may provide for a tolerance within which the speed vary, but this tolerance is normally very narrow; an acceptable tolerance may usually be about 1% of the constant speed value within which the rotational speed may vary and still be considered as constant.

Similarly, if the prime mover 160 rotates within a range that is bound between fixed upper and lower limits, then the output of the main generator 130 would be similarly bound within a known frequency range having fixed upper and lower limits, the precise bound and limits depend on specific machine design. For example, if the prime mover 160 rotates the drive shaft 150 at speeds of 4000 rpm to 8000 rpm, then the generator system 100 of the invention may be configured as in the previous paragraph with a fixed 133 Hz negative sequence excitation to exciter stator windings 404, according to the general formula regarding frequency calculation described earlier. The output frequency would be bound between 400 Hz and 667 Hz, not 400 Hz and 800 Hz as would be the case with a conventional synchronous generator. The narrower frequency band obtained by this system may create a narrower variable frequency or VF system that may benefit all electric power utilization equipment in the aircraft, in addition to the previously claimed benefit of increased reliability due to elimination of rotating diodes and associated parts.

Thus, it may be seen that the AC generator system and method described herein may supply relatively constant frequency AC power when the generator is driven by a variable speed prime mover, by independently controlling the field rotational speeds. The disclosed generator system and method can be implemented with no restrictions on the number of poles for the exciter or main generator.

It should be understood, of course, that the foregoing relates to exemplary embodiments of the invention and that modifications may be made without departing from the spirit and scope of the invention as set forth in the following claims.

We claim:
1. A generator system comprising:
a main generator having a main generator rotor and a main generator stator, the main generator rotor with a plurality of main generator rotor windings wound thereon, the main generator stator with a plurality of main generator stator windings wound thereon;
an exciter having an exciter rotor and an exciter stator, the exciter rotor having exciter rotor windings wound thereon, the exciter stator having exciter stator windings wound thereon;
wherein the exciter rotor is configured to provide two phase excitation current to the main generator rotor windings;
wherein the main generator rotor windings have two phases;
wherein the main generator rotor and the exciter rotor are configured to rotate in a first direction at a variable rotational speed;
wherein an exciter controller supplies a multi-phase electrical excitation to the exciter stator windings in the phase sequence that is in either the first direction or a second direction opposite the first direction; and
wherein the exciter rotor windings and the main generator rotor windings have a phase shift in space and time.
2. The generator system of claim 1, wherein the electrical excitation supplied to the exciter stator is AC excitation.
3. The generator system of claim 1, wherein the electrical excitation supplied to the exciter stator is DC excitation.

4. The generator system of claim 1, wherein the amount of phase shift is a value within a range of about 80 electrical degrees to about 100 electrical degrees.

5. The generator system of claim 4, wherein the amount of phase shift is 90 electrical degrees.

6. The generator system of claim 1, wherein the exciter controller receives a speed signal Ns from a device that senses the speed of a shaft, wherein the device is selected from the group consisting of a permanent magnet generator, a speed sensor, and the main stator windings.

7. The generator system of claim 1, further comprising:
a permanent magnet generator mounted on a shaft and configured, upon rotation thereof, to provide a speed signal to an exciter controller, the speed signal being representative of the rotational speed of the shaft,
wherein the exciter controller provides electrical excitation having a supply amplitude, a frequency, and a phase sequence based at least in part on the speed signal.

8. The generator system of claim 1, further comprising:
a speed sensor configured to sense the rotational speed of a shaft and supply a speed signal representative thereof to an exciter controller,
wherein the exciter controller determines the rotational speed of the shaft based at least in part on the speed signal.

9. The generator system of claim 1, wherein:
the main generator rotor is implemented as a N-pole rotor;
the exciter rotor is implemented as a M-pole rotor; and
N and M are each integers greater than one.

10. The generator system of claim 7, wherein the main generator rotor and the exciter rotor and permanent magnet generator rotor are disposed to rotate about a common shaft.

11. The generator system of claim 10, further comprising:
a prime mover coupled to the shaft and configured to rotate the shaft at all speeds within a range.

12. The generator system of claim 1, wherein the exciter rotor windings are wound around cores of a type selected from a group consisting of salient cores and cylindrical cores.

13. The generator system of claim 1, wherein the main generator rotor windings are wound around cores of a type selected from a group consisting of salient cores and cylindrical cores.

14. The generator system of claim 1, further comprising:
a prime mover coupled to the shaft and configured to rotate at a constant speed.

* * * * *